United States Patent [19]
Tucker et al.

[11] Patent Number: 6,148,244
[45] Date of Patent: Nov. 14, 2000

[54] EQUIPMENT PATHING AND UNIT ALLOCATION FOR A PROCESS CONTROL SYSTEM

[75] Inventors: Mark Tucker, Marlborough; Eric Jacobson, Newton; Joseph Bangs, Wrentham, all of Mass.

[73] Assignee: Intellution, Inc., Norwood, Mass.

[21] Appl. No.: 09/059,209

[22] Filed: Apr. 13, 1998

[51] Int. Cl.[7] ............................................. G06F 19/00
[52] U.S. Cl. ........................................................ 700/100
[58] Field of Search .................................. 700/246, 17, 8, 700/99, 100

[56] References Cited

U.S. PATENT DOCUMENTS

| | | | |
|---|---|---|---|
| 5,291,394 | 3/1994 | Chapman | 705/8 |
| 5,499,188 | 3/1996 | Kline, Jr. et al. | 700/106 |
| 5,576,946 | 11/1996 | Bender et al. | 700/17 |
| 5,737,498 | 4/1998 | Murray | 700/246 |
| 6,000,830 | 12/1999 | Asano et al. | 700/121 |

*Primary Examiner*—William Grant
*Assistant Examiner*—Chad Rapp

*Attorney, Agent, or Firm*—Wolf, Greenfield & Sacks, P.C.

[57] ABSTRACT

According to one embodiment, a recipe for use with a process control system includes unit procedures (to be executed on units) and information that identifies unit procedures that must be executed on units that are physically connected to one another, unit procedures that must be executed on the same unit, and/or unit procedures that must be executed on different units. According to another embodiment, a method for configuring a recipe includes the step of storing information in memory that identifies unit procedures of the recipe that must be executed on units that are physically connected to one another, unit procedures of the recipe that must be executed on the same unit, and/or unit procedures of the recipe that must be executed on different units. According to yet another embodiment, a method for configuring a process control system includes the steps of storing first information in memory that identifies unit procedures that must be executed on units that are physically connected to one another, unit procedures that must be executed on the same unit, and/or unit procedures that must be executed on different units; and storing second information in memory that identifies units that are physically connected to one another.

72 Claims, 10 Drawing Sheets

| SOURCE UNIT PROC. | DESTINATION UNIT PROC. | SAME/DIFFERENT |
|---|---|---|
| UP_MIX_A | UP_MIX_B | SAME |
| UP_REACT_A | UP_REACT_B | DIFFERENT |

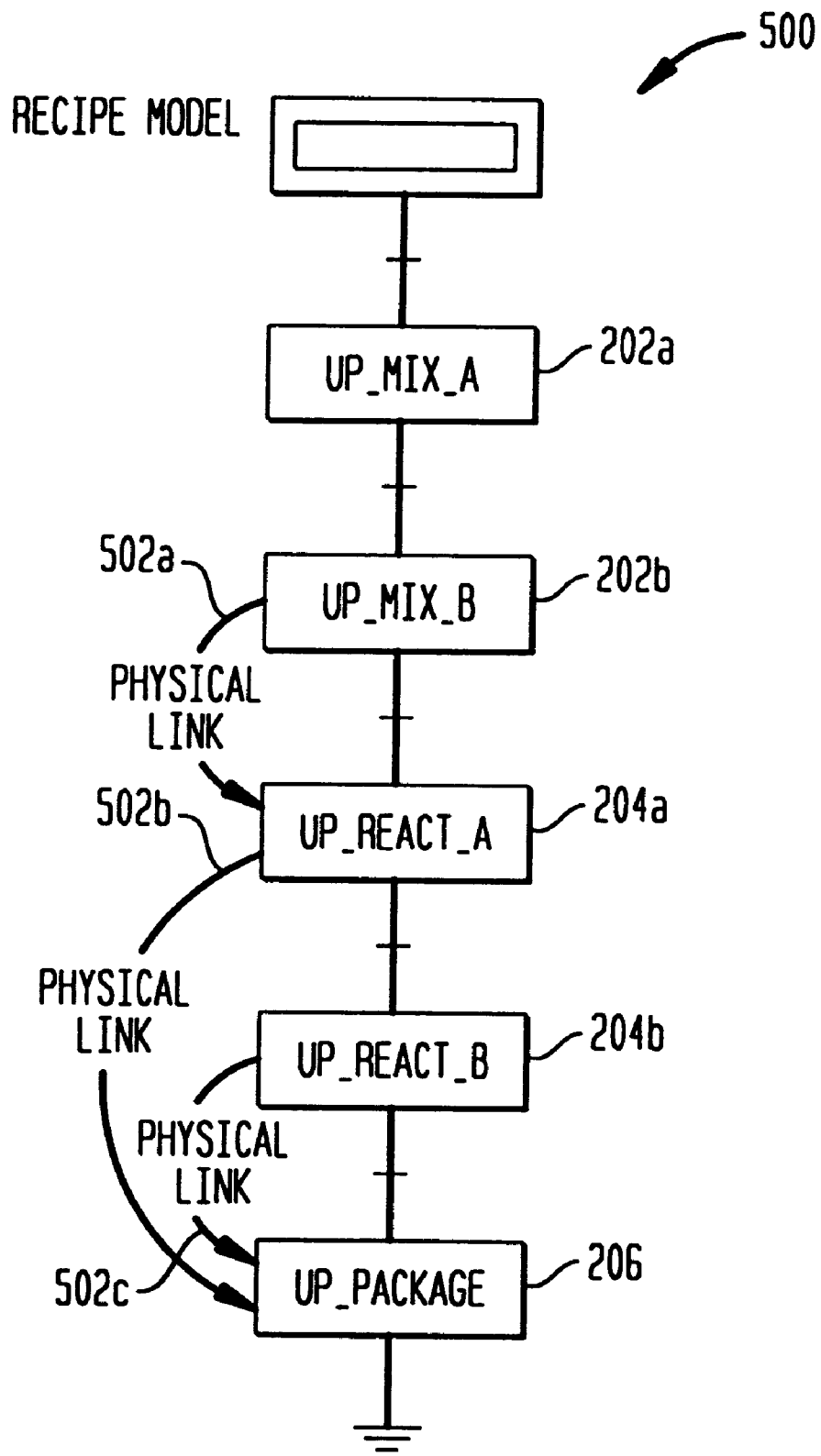

| UNIT | NODE |
|---|---|
| MIXER 1 | NODE 1 |
| MIXER 2 | NODE 2 |
| MIXER 3 | NODE 3 |
| REACTOR 1 | NODE 4 |
| REACTOR 2 | NODE 5 |
| REACTOR 3 | NODE 6 |
| PACKAGE 1 | NODE 7 |
| PACKAGE 2 | NODE 8 |

| STEP | NODE |
|---|---|
| UP_MIX_A | NODE 1 |
| UP_MIX_B | NODE 1 |
| UP_REACT_A | NODE 2 |
| UP_REACT_B | NODE 3 |
| UP_PACKAGE | NODE 4 |

EQUIPMENT PATHING AND UNIT ALLOCATION FOR A PROCESS CONTROL SYSTEM

BACKGROUND OF THE INVENTION

1. Field of Invention

The present invention is directed to control systems and, more particularly, to process control systems and software therefor that may be used to control and monitor the operation of an industrial facility.

2. Discussion of Related Art

Process control systems are used in industrial facilities (such as manufacturing and power plants) to control and monitor the operation of various pieces of equipment. Examples of such process control systems are described in co-pending U.S. patent application Ser. No. 08/623,742 and U.S. Pat. No. 5,179,710, which are assigned to the assignee of the present invention, and which are incorporated herein by reference.

One use of a process control system is to control the operation of several pieces of equipment in order to execute a recipe. A recipe may be, for example, a procedure pursuant to which a series of steps (e.g., mixing, heating or cooling) are performed on one or more pieces of equipment to yield a so-called "batch" of a product.

Generally, several different pieces of equipment or "units" (e.g., mixers, reactors or packagers), some of which may be physically connected together (e.g., using pipes and valves) to pass ingredients from one to another, are required to produce a batch. When a batch of a recipe is scheduled, it is therefore necessary to specify which procedures are to be performed on which units.

Each procedure executed on a unit is called a "unit procedure." Generally, each unit procedure includes several so-called "operations" to be performed on the unit, and each operation includes several so-called "recipe phases." Each recipe phase is used to control a particular minor processing task of a piece of equipment, e.g., heat or cool, which commonly are referred to as "equipment phases." Control of these equipment phases may be accomplished, for example, with a programmable logic device (PLD).

Using existing systems, when a batch of a recipe is scheduled to be executed on several individual units, a system operator may be required to specify which unit procedures will be executed on which units. To accomplish this task, the system operator may be presented with a so-called "area model," which identifies the units that are available for use, and a so-called "recipe model," which identifies the unit procedures that must be executed to process a recipe. Examples of these models are shown in FIGS. 1 and 2, respectively.

FIG. 1 shows an exemplary prior art area model 100, which includes three classes of equipment: (1) a mixer class, including mixers 102a–102c; (2) a reactor class, including reactors 104a–104c; and a packager class, including packagers 106a–106c. Each piece of equipment in a particular class is capable of performing identical procedures and associated equipment phases.

FIG. 2 shows an exemplary prior art recipe model 200 listing unit procedures that may be executed on a group of units, e.g., the units in area model 100 (FIG. 1), in order to process a recipe. Recipe model 200 is in the form of a sequential function chart (SFC), which specifies the unit procedures that must be executed on appropriate units in order to generate a batch of a recipe.

In an SFC, unit procedures that are arranged horizontally adjacent one another on the same vertical level are executed in parallel, i.e., concurrently, and the various vertical levels of unit procedures are executed sequentially from the top level to the bottom level. The primary function of an SFC therefore is to specify the order in which groups of parallel-executed unit procedures are to be executed, regardless of the equipment on which they are executed, to generate a recipe. Additional information regarding SFCs in general is available from the International Electrotechnical Commission (IEC) in a document entitled Draft IEC 1131-1: Programmable Controllers-Part 3, submitted Feb. 14, 1992, which is incorporated herein by reference.

As shown, recipe model 200 includes five distinct unit procedures 202a, 202b, 204a, 204b and 206. Because the five unit procedures are vertically stacked in the SFC, they are to be executed in sequence from top (i.e., unit procedure 202a) to bottom (i.e., unit procedure 206).

Using only the information in area model 100 and recipe model 200, in addition to the operator's personal knowledge, the operator must specify: (a) which of mixers 102a–102c will execute each of "mix" unit procedures 202a and 202b, (b) which of reactors 104a–104c will execute each of "react" unit procedures 204a and 204b, and (c) which of packagers 106a and 106b will execute "packaging" unit procedure 206.

Because of the limited information in prior art area and recipe models, the equipment operator may assign unavailable or non-functional equipment to perform unit operations, or may fail to assign physically-connected pieces of equipment to perform unit procedures when such connections are necessary. These mistakes can cause malfunctions to occur within the processing facility.

SUMMARY OF THE INVENTION

Applicants have recognized that prior art area and recipe models, such as those shown in FIGS. 1 and 2, do not provide the operator with the information necessary to allocate units to unit procedures adequately in all situations. Instead, in order to perform this allocation adequately, in addition to the information provided in prior art area and recipe models, the equipment operator needs to have personal knowledge, or must obtain information from another source, regarding: (1) the units in area model 100 that are functional and available to be used to execute the recipe, (2) the units in area model 100 that are physically connected to one another so that materials may be passed therebetween, (3) the unit procedures in recipe model 200 that must be executed on units that are physically-connected to one another, (4) the unit procedures in recipe model 200 that must be executed on the same unit, and (5) the unit procedures in recipe model 200 that must be executed on different units.

According to embodiment of the present invention, one or more pieces of this information are stored in memory and may be presented to the operator as part of an area model or a recipe model, or may be used to dynamically bind unit procedures to particular units.

Applicants additionally have recognized that, in prior art systems, after a batch of a recipe has been scheduled, the equipment assignments for the unit procedures of the recipe cannot be altered. This inability to alter equipment assignments after batch scheduling also can cause malfunctions to occur within the facility.

According to another embodiment of the present invention, binding of unit procedures to particular units is deferred until just prior to when each unit procedure is executed so that unit assignments for the unit procedures of the recipe may be altered any time prior to when the binding actually takes place.

According to one aspect of the present invention, a recipe for use with a process control system includes unit procedures (to be executed on units) and information that identifies unit procedures that must be executed on units that are physically connected to one another, unit procedures that must be executed on the same unit, and/or unit procedures that must be executed on different units.

According to another aspect of the present invention, a method for configuring a recipe includes the step of: storing information in memory that identifies unit procedures of the recipe that must be executed on units that are physically connected to one another, unit procedures of the recipe that must be executed on the same unit, and/or unit procedures of the recipe that must be executed on different units.

According to another aspect of the invention, a computer readable medium has a plurality of instructions stored thereby which, when executed by a processor, cause the processor to perform the step of (in response to input by a user) storing information that identifies unit procedures of the recipe that must be executed on units that are physically connected to one another, unit procedures of the recipe that must be executed on the same unit, and/or unit procedures of the recipe that must be executed on different units.

According to yet another aspect of the invention, an apparatus for configuring a recipe includes a memory and means, responsive to user input, for storing information in the memory that identifies unit procedures of the recipe that must be executed on units that are physically connected to one another, unit procedures of the recipe that must be executed on the same unit, and/or unit procedures of the recipe that must be executed on different units.

According to another aspect of the invention, a method for configuring a process control system includes the steps of: (a) storing first information in memory that identifies unit procedures that must be executed on units that are physically connected to one another, unit procedures that must be executed on the same unit, and/or unit procedures that must be executed on different units, and (b) storing second information in memory that identifies units that are physically connected to one another.

According to yet another aspect, a system for configuring a process control system includes means, responsive to input from a user, for storing first information in memory that identifies unit procedures that must be executed on units that are physically connected to one another, unit procedures that must be executed on the same unit, and/or unit procedures that must be executed on different units; and means, responsive to input from the user, for storing second information in memory that identifies units that are physically connected to one another.

BRIEF DESCRIPTION OF THE DRAWINGS

The present invention will be more clearly appreciated from the following detailed description when taken in conjunction with the accompanying drawings, in which like-reference numerals indicate like structures or method steps, and in which the left-most one or two numerals of a reference numeral indicate the number of the figure in which the referenced element first appears, and in which:

FIG. 5 is a diagram showing a recipe model constructed according to an embodiment of the invention;.

DETAILED DESCRIPTION OF THE INVENTION

System Hardware

Figure 3:
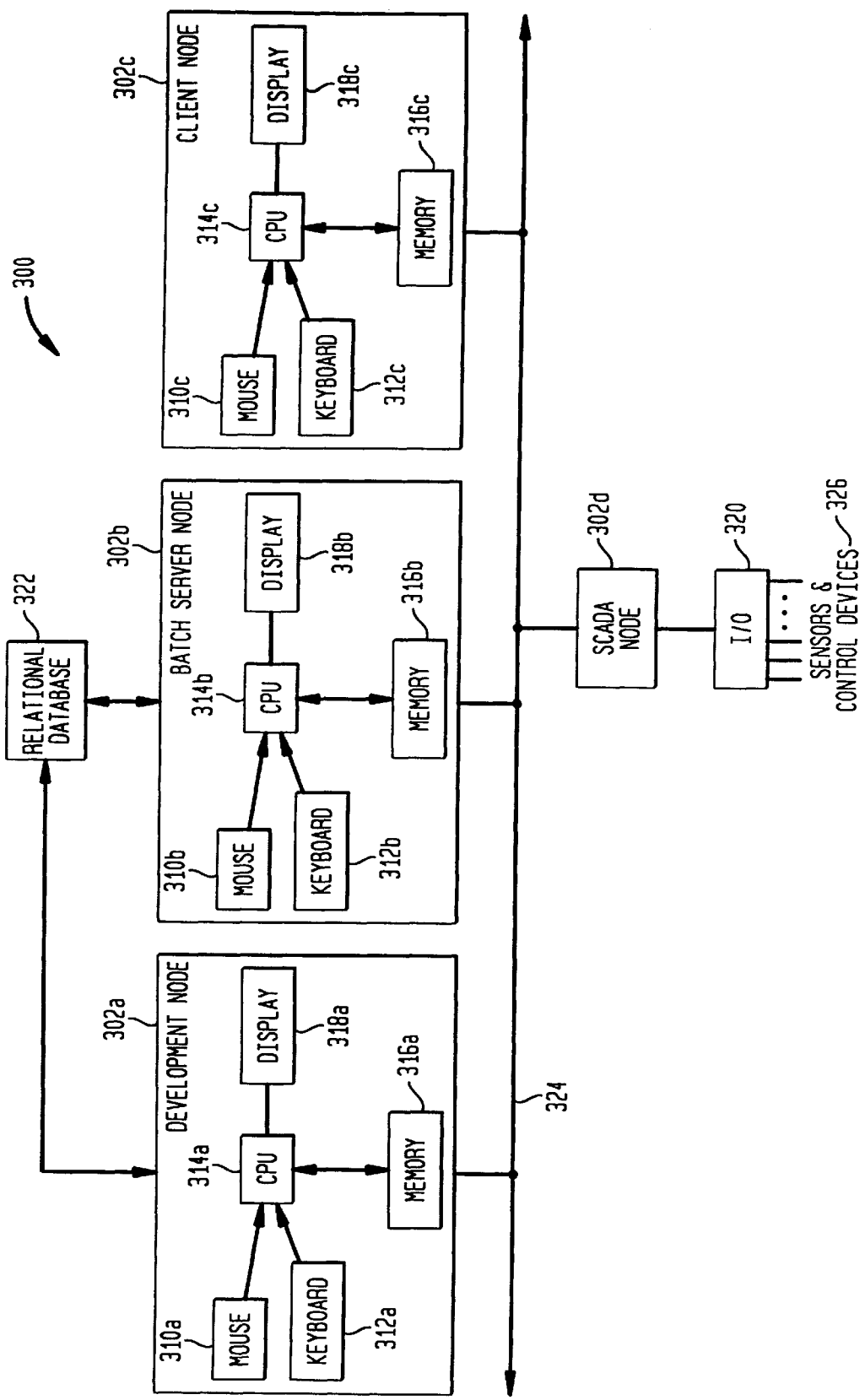
FIG. 3 is a block diagram showing a system with which an embodiment of the present invention may be employed.

FIG. 3 is a process control system 300 that may be used to control the execution of recipes on various pieces of equipment according to one embodiment of the present invention. As shown, process control system 300 includes a network 324 to which several computers (e.g., IBM PS/2 computers) are connected. Specifically, network 324 interconnects a Development Node 302a, a Batch Server Node 302b, a Client Node 302c, and a Supervisory Control and Data Acquisition (SCADA) node 302d. In the embodiment shown, each of nodes 302a–302c may include standard computer hardware: a central processing unit (CPU) 314, a mouse 310, a keyboard 312, a memory 316, and a display 318. Additionally, in the embodiment shown, Development Node 302a and Batch Server Node 302b may be connected to a relational database 322 in which process control information (described below) may be stored.

SCADA node 302d also may include standard computer hardware (not shown). In the embodiment shown, SCADA node 302d is connected to an input/output (I/O) device 320 which receives inputs from, and provides outputs to, sensors and control devices 326 included in one or more pieces of equipment (not shown). I/O device 320 may include, for example, a programmable logic device (PLD). A CPU (not shown) may communicate with I/O device 320 via an I/O driver (not shown) within SCADA node 302d.

Typically, several additional SCADA nodes will be connected to network 324 to communicate with additional pieces of equipment and each SCADA node will include several additional I/O devices to receive inputs from, and provide outputs to, the sensors and control devices included in the equipment to which they are connected. The operation of SCADA nodes to control and monitor processing equipment is described in co-pending U.S. patent application Ser. No. 08/623,742 and U.S. Pat. No. 5,179,710 (which are incorporated by reference above). It should be understood, however, that SCADA nodes need not be used to funnel data between network 324 and the equipment-controlling I/O devices, such as I/O device 320, and that nodes 302a–302c may alternatively communicate directly with I/O devices or may communicate through devices other than SCADA nodes that perform similar functions as do SCADA nodes.

Additionally, it should be appreciated that each of nodes 302a–302d need not be implemented on separate computers and may alternatively be implemented on a single computer or on less than all of the computers shown in FIG. 3. Further, nodes 302a–302c need not include all of the components illustrated in FIG. 3 and more, fewer, or different components than those shown in FIG. 3 may alternatively be used. It should also be understood that system 300 may include more than one of each of Development Node 302a, Batch Server Node 302b and Client Node 302c to increase the performance and functionality of the system.

System Operational Overview

The computer(s) constituting the various nodes described above may be programmed using an object-oriented programming language, such as Smalltalk, JAVA, or C++. In object-oriented programming, code and data that are related may be combined into objects. An object is an instance of an entity that embodies both specific data and the functions that manipulate it. In object-oriented programming, an object is an entity that has state, behavior and identity. Objects are created, or instantiated, during the execution of an object-oriented program wherein instances of objects are created. Objects may be related, as in a parent-child relationship, wherein features such as methods and/or data structures are inherited by a child object from a parent object. Objects are typically created in class hierarchies, and the methods and/or data structures of objects may be inherited through the hierarchy.

It should be understood, however, that the present invention may be implemented in any programming language suitable for implementing the necessary routines, procedures and methods. For example, the invention may alternatively be implemented using a functional or structured programming language.

Each of nodes 302a–d communicates extensively with the other nodes in order to operate according to one embodiment of the invention. Therefore, to facilitate the description of the operation of each of nodes 302a–302c in detail below, an operational overview of each of these nodes will first be provided.

Development Node 302a may be used by a process engineer: (1) to define or modify an area model which, in addition to identifying the units that are presently available to execute unit procedures of recipes, reflects the physical interconnections that exist between the units, and (2) to define or modify recipe models which, in addition to identifying the unit procedures that must be executed in order to execute particular recipes, reflect: (a) the physical connections that must exist between the units on which particular unit procedures are executed, (b) unit procedures that must be executed on the same unit, and (c) unit procedures that must be executed on different units. To perform these functions, memory 316a of Development Node 302a is programmed, respectively, with two applications: (1) a so-called "Equipment Editor," and (2) a so-called "Recipe Editor," each of which is described in detail below.

Batch Server Node 302b is the batch engine for system 300. Memory 316b may be programmed with an executable file which may be called by Client Node 302c to execute a specified recipe. Batch Server Node 302b uses the information contained in the area model and a given recipe model (as defined by Development Node 302a) in conjunction with information provided by an operator (via Client Node 302c) to allocate available units for particular unit procedures and executes the recipe using the selected units. Batch Server Node 302b also provides information to Client Node 302c regarding the current status of the recipe and the equipment being used to execute the recipe.

Using a so-called "Client" application stored in memory 316c of Client Node 302c, Client Node 302c manages batch scheduling and execution and receives information from Batch Server Node 302b regarding the current status of any recipes being executed and the equipment being used to execute such recipes. Client Node 302c may also access (read only) area models and recipe models from Batch Server Node 302b and may communicate with Batch Server Node 302b to select or change the allocation of equipment to particular unit procedures, if the ability to do so has been enabled by Development Node 302a, as explained below.

Detailed Operational Description

Now that a brief operational overview of each of the nodes 302a–302c has been provided, the operation of each of these nodes will now be described in detail.

Development Node 302a

As mentioned above, Development Node 302a runs two primary applications: (1) an Equipment Editor, and (2) a Recipe Editor. Each of these editors will now be described, in turn.

The Equipment Editor

The Equipment Editor may be implemented using on object-oriented programming language, e.g., C++, Smalltalk or JAVA, and may be stored in memory 316a and executed by processor 314. It may be used by a process design engineer to develop an area model representing the available equipment on a plant floor. This area model may be stored in memory 316a of Development Node 302a, e.g., in one or more binary files, and/or in relational database 322, and may be presented to the process design engineer via processor 314a and display 318a.

The area model developed by the process engineer will include one or more so-called "process cells." A process cell includes the production and supporting equipment necessary to make a batch of a recipe. Three types of process cells may be defined: (1) a single path structure, which is a group of units through which a batch may be processed sequentially, (2) a multiple path structure, which includes several single path structures in parallel, with no product transfer between them, and (3) a network path structure, in which a batch may follow multiple execution paths through the process cell.

According to one embodiment, for each unit or class of units within a process cell, the process engineer also defines so-called "equipment modules" and "control modules" that constitute the unit or class of units. Equipment modules and control modules are used to execute equipment phases. Further details regarding how to classify equipment into units and modules may be found in a document entitled, "Batch Control Part 1: Models and Terminology," ISA-S88.01, which is available from Intellution, Inc., of Norwood, Mass., the assignee of the present invention, and which is incorporated herein by reference.

Additionally, according to one embodiment, the process engineer may define how much material each unit in the area model can hold or process (i.e., the capacity of the unit) as well as the I/O point(s) of the equipment that will be used to indicate the unit's "Ready" status and "Priority" status. The unit's Ready status is used to indicate whether a particular unit is ready and available for recipe execution. The unit's Priority status may be used by Batch Server Node 302b to perform a function called "dynamic unit allocation" ("DUA") (which is explained in more detail below) if DUA is enabled by the process design engineer (at Development Node 102a) or the operator (at Client Node 102c) for a selected recipe.

Figure 1:
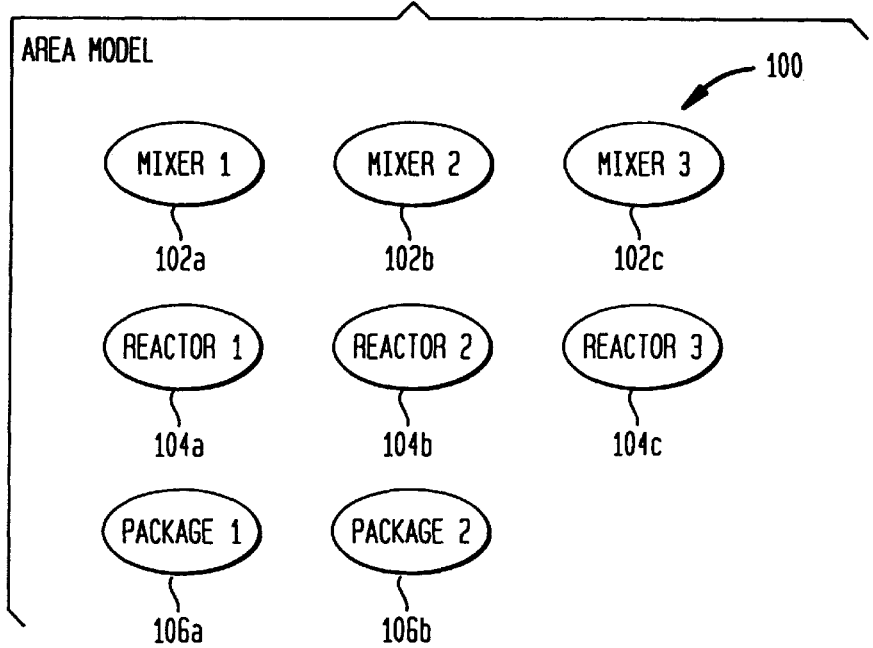
FIG. 1 is a diagram showing a prior art area model.
Figures 4, 5B:
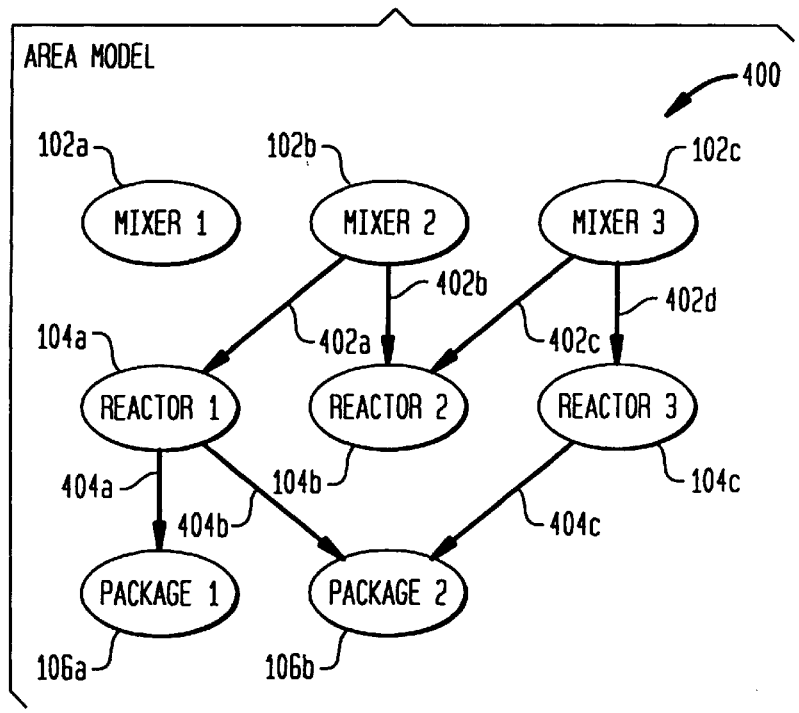
FIG. 4 is a diagram showing an area model constructed according to an embodiment of the invention.

FIG. 4 shows an example of an area model 400 for a single process cell according to one embodiment of the invention. Area model 400 is developed or may be modified by the process design engineer using the Equipment Editor application running on Development Node 102a. Area model 400 includes the same units (i.e., units 102, 104 and 106) as does area model 100 (FIG. 1), but also includes: (a) so-called "existing physical link identifiers" 402a–402d, which illustrate the existing physical connections (e.g., pipes and valves) between mixers 102a–102c and reactors 104a–104c; and (b) existing physical link identifiers 404a–404c, which illustrate the existing physical connections between reactors 104a–104c and packagers 106a and 106b. In the example shown, the existing physical link identifiers are illustrated by arrows. The direction in which each of these arrows points indicates the direction in which material can flow from one unit to another. Optionally, each of the existing physical link identifiers may be labeled to describe the purpose of the physical link between the units.

Information regarding each unit and each existing physical link identifier in area model 400, as well as the additional information described above, may be stored in memory 316a of Development Node 302a and/or in relational database 322. The process design engineer may use mouse 310a, keyboard 312a, or any other device capable of providing a user interface to CPU 112, to modify this information. According to one embodiment, the design engineer can use mouse 310a to select objects (e.g., a unit or a physical link identifier) on display 318a and to drop the objects at new locations in order to reconfigure area model 400 or may select objects from a object template in order to produce new objects on the display.

The Recipe Editor

The Recipe Editor also may be implemented using an object-oriented programming language, e.g., C++, Smalltalk or JAVA, and may be stored in memory 316a and executed by processor 314. It may be used by the process design engineer to develop recipe models, which represent recipes that may be executed by Batch Processor Node 302b. These recipe models may be stored in memory 316a of Development Node 302a, e.g., in one or more binary files, and/or in relational database 322 and may be presented to the process design engineer via processor 314a and display 318a.

As discussed above, each recipe includes several unit procedures that may be executed on one or more units. Each unit procedure, in turn, includes one or more operations, and each operation includes one or more recipe phases. For each recipe, the process design engineer therefore develops and stores unit procedures (including the operations and recipe phases constituting them) that may be executed on particular units or classes of units in memory 316a and/or relational database 322. Operations may be developed, for example, using "operation" sequential function charts (SFCs) (each including one or more recipe phases), and unit procedures may be developed, for example, using "unit procedure" SFCs (each including one or more operations). Information identifying the unit or class of units on which each unit procedure can be executed may be stored in memory 316a and/or relational database 322 along with the unit procedure.

After developing and storing unit procedures in memory 316a and/or relational database 322, the process design engineer may design a recipe by specifying a sequence of unit procedures, e.g., using a "procedure" SFC, that are to be performed when the recipe is executed. Referring to FIG. 5A, recipe model 500, which is in the form of a procedure SFC, is an example of such a sequence of unit procedures.

Figure 2:
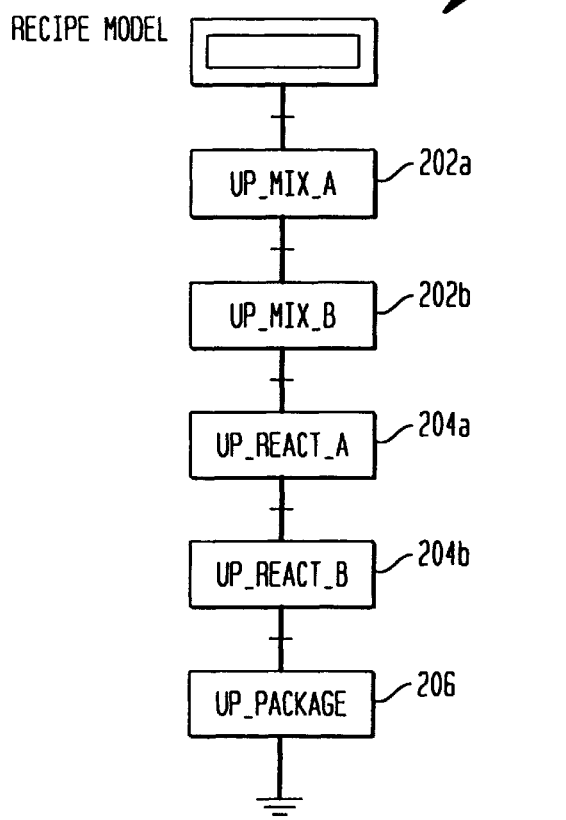
FIG. 2 is a diagram showing a prior art recipe model.

Recipe model 500 includes the same unit procedures (i.e., unit procedures 202a, 202b, 204a, 204b and 206) as does recipe model 200 (FIG. 2), but also includes so-called "required physical link identifiers" 502a–502c. Each of required physical link identifiers 502a–502c is connected between a pair of unit procedures and identifies a physical connection (e.g., via pipes and valves) that is required to be present between the pair of units that will execute the pair of unit procedures. In the example shown in FIG. 5, the required physical link identifiers are illustrated by arrows. The direction in which each of these arrows points indicates the direction in which material is required to flow from one unit (which will execute one of the unit procedures) to another unit (which will execute the other of the unit procedures).

Therefore, if the recipe represented by recipe model 500 were to be executed on the equipment represented by area model 400 (FIG. 4), then: (1) required physical link identifier 502a identifies that the one of mixers 102a–102c on which unit procedure 202b is to be executed must be physically connected (so that materials can be passed in the direction indicated by the arrow) to the one of reactors 104a–104c on which unit procedure 204a is to be executed; (2) required physical link identifier 502b identifies that the one of reactors 104a–104c on which unit procedure 204a is to be executed must be physically connected (so that materials can be passed in the direction indicated by the arrow) to the one of packagers 106a and 106b on which unit procedure 206 is to be executed; and (3) required physical link identifier 502c identifies that the one of reactors 104a–104c on which unit procedure 204b is to be executed must be physically connected (so that materials can be passed in the direction indicated by the arrow) to the one of packagers 106a and 106b on which unit procedure 206 is to be executed.

When designing a recipe, the process design engineer also may specify that: (1) two or more unit procedures must be executed on the same unit, or (2) two or more unit procedures must be executed on different units. Table 510 (shown in FIG. 5B) illustrates how this information, which may be stored in memory 316a and/or relational database 322, may be presented to the engineer (e.g., on display 318a) in tabular format. As shown, table 510 includes: (a) a column 504 in which the process engineer may specify a source unit procedure; (b) a column 506 in which the engineer may specify a destination unit procedure; and (c) a column 508 in which the engineer may specify whether the source and destination unit procedures identified in columns 504 and 506 are to be executed on the same unit or on different units.

Thus, if the recipe represented by recipe model 500 and table 510 were to be executed using the equipment represented by area model 400 (FIG. 4), then: (1) unit procedure 202a (UP_MIX_A) and unit procedure 202b (UP_MIX_B) must be executed on the same one of mixers 102a–102c, and (2) and unit procedure 204a (UP_REACT_A) and unit procedure 204b (UP_REACT_B) must be executed on different ones of reactors 104a–104b.

For each unit procedure, the process design engineer also may specify the amount of material that the unit which will execute the unit procedure must be able to transfer, process, or contain in order to execute the unit procedure correctly. This information will prevent Batch Server Node 302b or the operator (at Client Node 302c) from allocating a unit to the unit procedure that has inadequate resources to service the unit procedure.

In designing each recipe, the process design engineer also may store information in memory 316a and/or relational database 322 identifying one of three methods by which units will be allocated to unit procedures during batch execution. That is, for each unit procedure in a recipe, the engineer may specify that: (1) Batch Server Node 302b is to automatically bind units in area model 400 to unit procedures in recipe model 500 based upon existing and required connections between units as well as the status of the units (Dynamic Unit Allocation); (2) the operator (at Client Node 302c) is to specify the unit to which the unit procedure will be bound when the batch is added to the Client Node's batch list (Operator Scheduled Unit Allocation); or (3) the operator (at Client Node 302c) is to be prompted to select a unit or instruct Batch Server Node 302b to automatically select a unit just before the unit procedure begins running (Operator Prompted Unit Allocation). Additionally, for each unit procedure, the process control engineer may store information in memory 316a and/or relational database 322 that controls the ability of the operator (at Client Node 302c) to modify the allocation of units to unit procedures when the batch is created, when the batch is being executed, or both. These features will be discussed in more detail below in connection with the description of the functionality of Batch Server Node 302b and Client Node 302c.

As mentioned above, information regarding each unit procedure, each required physical link identifier in recipe model 500, and the information in table 510, as well as the additional information described above, may be stored in memory 316a of Development Node 302a and/or in relational database 322. The process design engineer may use mouse 310a, keyboard 312a, or any other device capable of providing a user interface to CPU 112, to modify this information. According to one embodiment, the design engineer can use mouse 310a to select objects (e.g., a unit procedure or a required physical link identifier) on display 318a and to move the objects to new locations in order to reconfigure recipe model 500 or may select objects from a object template in order to produce new objects on the display.

Batch Server Node 302b

As mentioned above, Batch Server Node 302b is the batch engine for system 300. An executable file (programmed, for example, using an object-oriented programming language, e.g., C++, Smalltalk or JAVA) may be stored in memory 316b and may be executed by processor 314b. This executable file may be called by Client Node 302c to execute a specified recipe.

After a process design engineer has properly configured an area model and stored information representing the area model in memory 316a and/or relational database 322, Batch Server Node 302b may read this information from Development Node 302a and/or relational database 322 into memory 316b, and convert the information into a set of objects representing the area model. As noted above, this information may include, for example: (1) available units, (2) equipment and process modules within each unit, (3) existing physical links between two or more units, (4) the capacity of each unit, and (5) the I/O point(s) of the equipment that will be used to indicate the unit's "Ready" status and "Priority" status.

Using this set of objects (representing the area model), Batch Server Node 302b then may construct a so-called "area model graph." To build an area model graph, a node is created for each unit in the area model and the nodes so created are linked together (using so-called "edges") as source nodes and destination nodes in accordance with the existing physical link identifiers in the area model. This area model graph may be store in memory 316b.

Figures 6A, 6B:
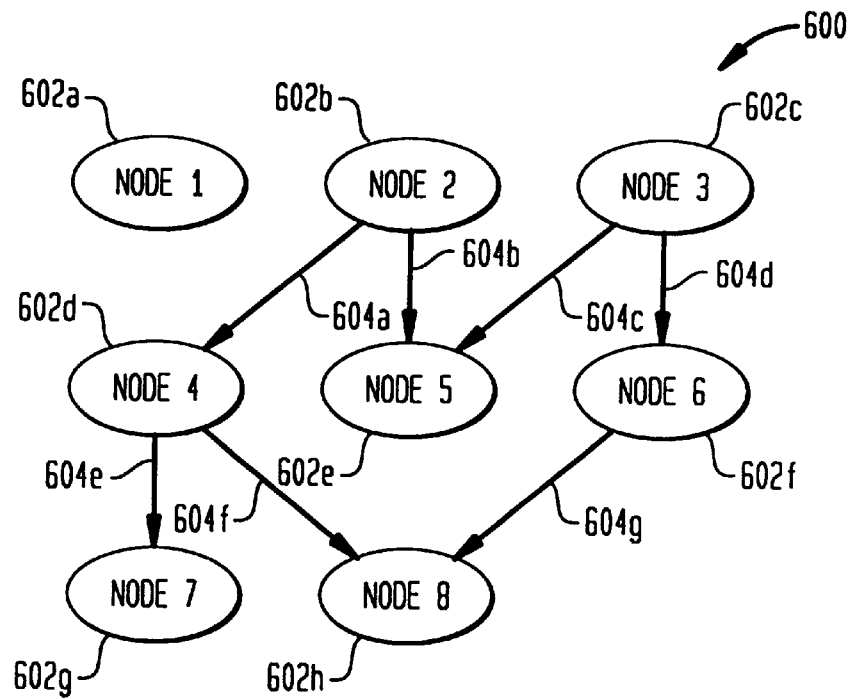
FIG. 6A is an area model graph constructed according to an embodiment of the invention.
FIG. 6B is a table showing information that may be stored with the nodes of the area model graph shown in FIG. 6A according to an embodiment of the invention.

An example of an area model graph 600, which corresponds to area model 400 (FIG. 4), is shown in FIG. 6A. As shown, nodes 602a–602h of area model graph 600 correspond, respectively, with units 102a–102c, 104a–104c, 106a and 106b of area model 400 (FIG. 4), and edges 604a–604g of area model graph 600 correspond, respectively, with existing physical link identifiers 402a–402d, and 404a–404c of area model 400 (FIG. 4). FIG. 6B illustrates information that is stored in order to identify each node as corresponding to a particular unit. Information may also be stored with each node indicating the capacity of the unit represented by the node. As described in more detail below, area model graph 600 (FIG. 6A) and the information illustrated in FIG. 6B may be used when a recipe is executed to allocate unit procedures to units efficiently.

The objects representing the area model and the area model graph need only be created when the process design engineer creates or changes the area model (at Development Node 302a). These objects therefore may be created, for example, upon initialization of Batch Server Node 302b, so long as Batch Server Node 302b is initialized each time the Equipment Editor is used to alter the area model.

When a batch of a given recipe is scheduled (at Client Node 302c), Batch Server Node 302b may read the information pertaining to the selected recipe from Development Node 302a and/or relational database 322, into its memory, e.g., memory 318b, and convert this information into a set of so-called "batch" objects representing the recipe. As noted above, this recipe-specific information (which is converted into batch objects) may include, for example: (1) a procedure SFC including one or more unit procedures; (2) one or more operation SFCs for each unit procedure included in the recipe; (3) one or more recipe phase SFCs for each operation included in the operation SFC; (4) information specifying which unit procedures must be executed on physically interconnected units; (5) information specifying which unit procedures must be executed on the same unit; (6) information specifying which unit procedures must be executed on different units; (7) information specifying the capacity requirements for units on which each unit procure is to be executed; (8) information identifying whether Batch Server Node 302b is to allocate units using Dynamic Unit Allocation, Operator Scheduled Unit Allocation, or Operator Prompted Unit Allocation; and (9) information identifying whether the operator may modify the allocation of units to unit procedures when the batch is created, when the batch is being executed, or both.

Figure 7:
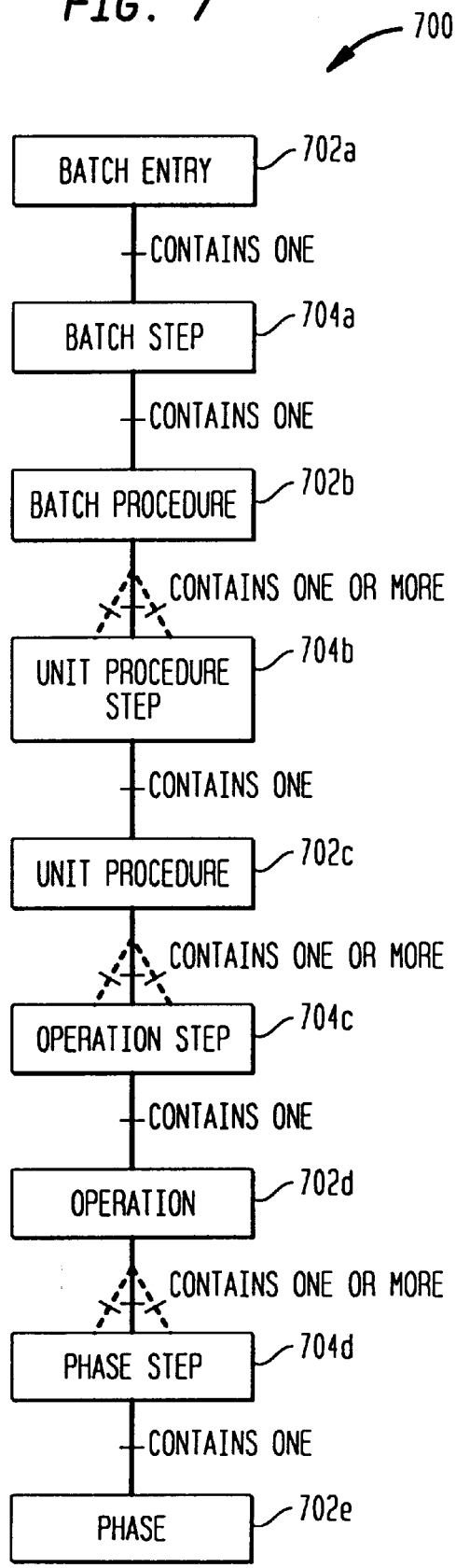
FIG. 7 is a diagram showing a hierarchy of objects that may be constructed according to an embodiment of the invention.

FIG. 7 shows an exemplary hierarchy 700 of several batch objects that may be automatically created and stored in memory 316b in response to the scheduling of a batch. The batch objects in hierarchy 700 therefore would exist in memory 318b at recipe execution time. As shown, hierarchy 700 includes several steps 704a–704d, with each step containing one of procedures 702b–704e, respectively. Procedure 702a (i.e., the "Batch Entry" object) contains a single step 704a (i.e., the "Batch Step" object). Each of procedures 702b–702d contains one or more of steps 704b–704d, respectively.

After creating the batch objects in hierarchy 700, Batch Server Node 302b may retrieve the information representing recipe model 500 and table 510 (FIGS. 5A and 5B) from Development Node 302a and/or relational database 322 and may generate two maps: (1) a first map that identifies, for each unit procedure in recipe model 500, the specific unit or class of units on which it is required to be executed; and (2) a second map that identifies, for each unit procedure in recipe model 500, (a) to which, if any, other unit procedures in recipe model 500 the unit procedure is connected by a required physical link identifier 502, and (b) which, if any, of the other unit procedures in recipe model 500 are required to be executed on the same or a different unit than the unit procedure (as identified in table 510). These maps may be stored in memory 316*b*. The stored maps are then used to construct a so-called "Recipe Graph," which may also be stored in memory 316*b*, as follows.

First, a node may be created for each of the unit procedures included in the first map and data may be stored with the node identifying it as corresponding to the specific unit or class of units identified in the first map.

Next, the information in the second map may be used: (1) to consolidate each pair of nodes identified as being required to be executed on the same unit into a single node; (2) to store information, if applicable, with each particular node indicating: (a) the existence of any other nodes corresponding to unit procedures that must be executed on different units than the unit on which the unit procedure corresponding to the particular node executed; and (b) the existence of any other nodes corresponding to unit procedures that must be executed on units that are physically linked to the unit on which the unit procedure corresponding to the particular node is executed.

Figures 8A, 8B:
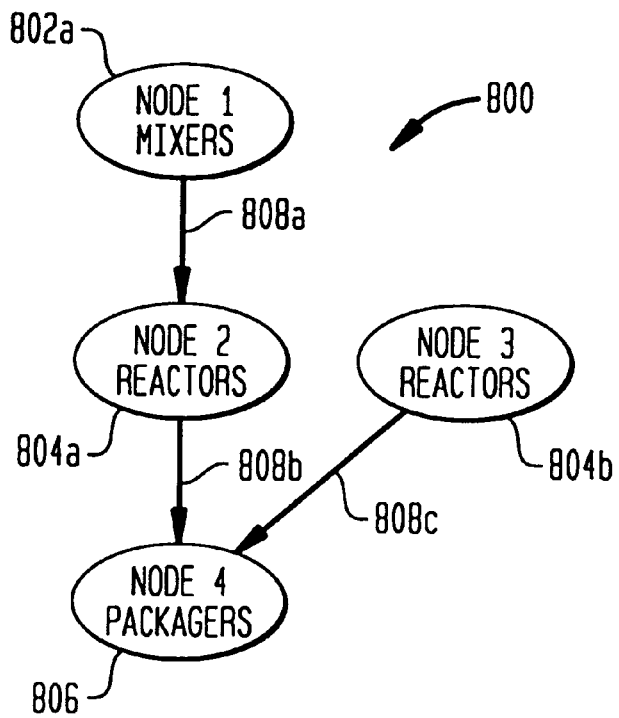
FIG. 8A is a recipe graph constructed according to an embodiment of the invention.
FIG. 8B is a table showing information that may be stored with the nodes shown in the recipe graph shown in FIG. 8A according to an embodiment of the invention.

An example of a recipe graph 800, which corresponds to recipe model 500 (FIG. 5), is shown in FIG. 8A. As shown, recipe graph 800 includes four nodes 802*a*, 804*a*, 804*b* and 806, and three edges 808*a*–808*c*. Recipe graph 800 therefore includes fewer nodes than recipe model 500.

Node 802*a* is identified as corresponding to the unit class: "MIXERS," e.g., mixers 102*a*–102*c* in area model 400 (FIG. 4); Nodes 804*a* and 804*b* are identified as corresponding to the unit class: "REACTORS," e.g., reactors 104*a*–104*c* in area model 400 (FIG. 4); and node 806 is identified as corresponding to the unit class: "PACKAGERS," e.g., packagers 106*a* and 106*b* in area model 400 (FIG. 4).

Because unit procedures 202*a* (UP_MIX_A) and 202*b* (UP_MIX_B) are identified in table 510 (FIG. 5) as being required to be executed on the same unit, node 802*a* in recipe graph 800 represents both of these unit procedures. Table 8B illustrates information that is stored along with recipe graph 800 in order to identify the unit procedure(s) to which each node in recipe graph 800 corresponds.

Because unit procedures 204*a* (UP_REACT_A) and 204*b* (UP_REACT_B) are identified in table 510 (FIG. 5) as being required to be executed on different units, information is stored with each of nodes 804*a* and 804*b* indicating that this is the case.

Each of the edges in recipe graph 800 corresponds to one of required physical link identifiers 502*a*–502*c* in recipe model 500 (FIG. 5). Specifically, edge 808*a* corresponds to required physical link identifier 502*a*; edge 808*b* corresponds to required physical link identifier 502*b*; and edge 808*c* corresponds to required physical link identifier 502*c*. After being constructed, recipe graph 800 and the information illustrated in FIG. 8B is stored in an object included in object 704*a* (i.e., the Batch Step object) of batch object hierarchy 700 (FIG. 7). As described in more detail below, recipe model graph 800 (FIG. 8A) and the information illustrated in FIG. 8B are used, in conjunction with area model graph 600 and the information illustrated in FIG. 6B, when a recipe is executed to allocate unit procedures to units efficiently.

According to one embodiment of the invention, unit procedures are not allocated to units until just before the unit procedures are actually executed. This feature is called "deferred binding" because units are bound to particular unit procedures after a batch has been scheduled, rather than when the batch is scheduled. How the allocation of units to unit procedures takes place depends on how the recipe was designed by the process design engineer (at Development Node 302*a*). That is, for each unit procedure of a recipe, the process design engineer will have specified whether a unit is to be allocated to that unit procedure via: (1) Dynamic Unit Allocation, (2) Operator Scheduled Unit Allocation, or (3) Operator Prompted Unit Allocation. Each of these options is explained below.

According to one embodiment, a so-called "BindSelection" object is included in object 704*a* (i.e., the Batch Step object) in batch object hierarchy 700 (FIG. 7). This BindSelection object includes several constituent methods, each of which executes a procedure related to the allocation of units to particular unit procedures. Three routines (illustrated in FIGS. 9–11) pursuant to which these constituent methods of the BindSelection object, as well as methods of other objects, are performed in order to allocate units to particular unit procedures will now be described, in turn, for unit procedures for which: (1) Dynamic Unit Allocation, (2) Operator Scheduled Unit Allocation, and (3) Operator Prompted Unit Allocation, have been enabled.

Figure 9:
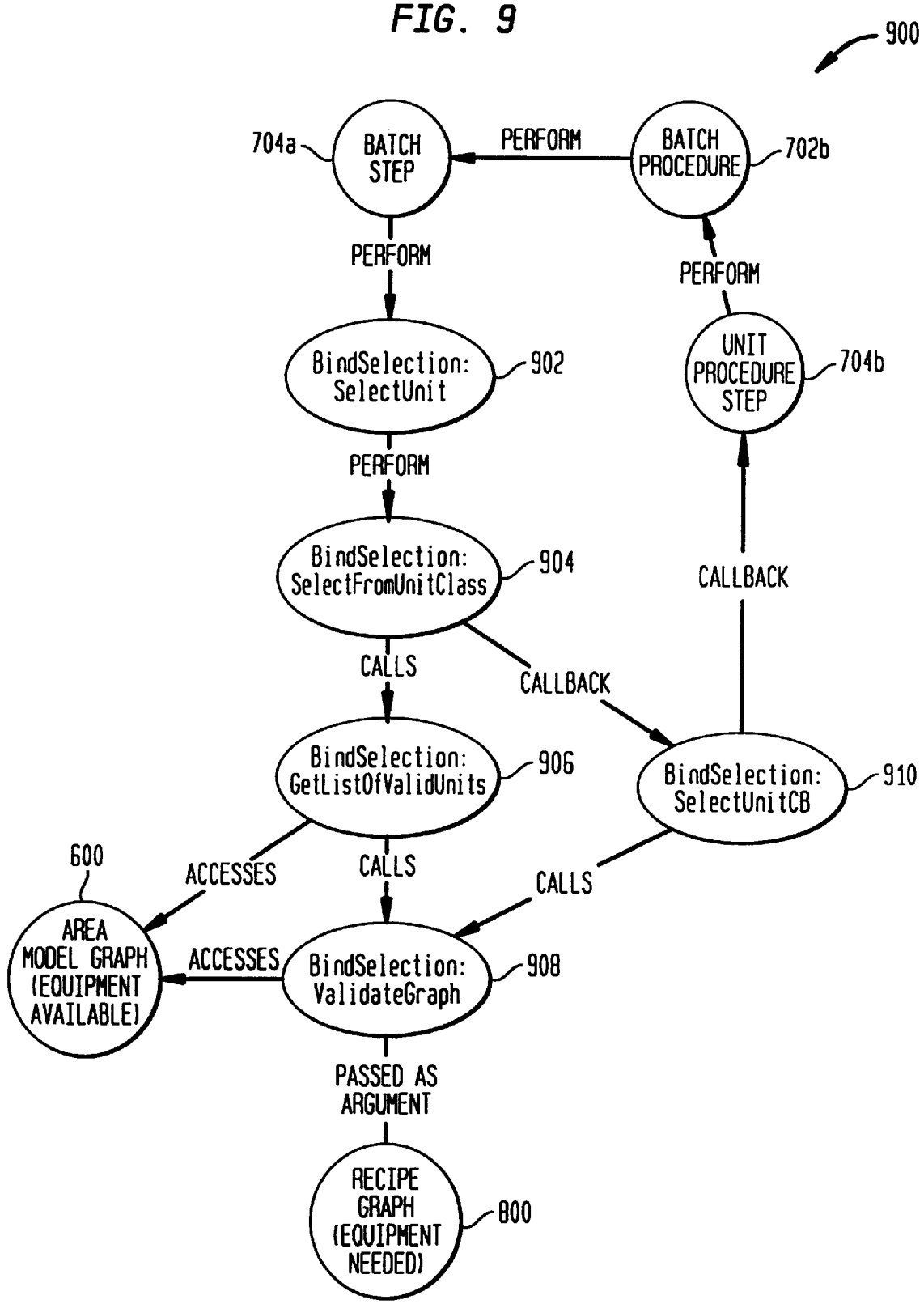
FIGS. 9–11 are flow diagrams showing procedures pursuant to which units may be bound to unit procedures of a recipe.

FIG. 9 illustrates a software-implemented routine 900 pursuant to which constituent methods of the BindSelection object, as well as the methods of other objects, may be executed by processor 314*b* of Batch Server Node 302*b* (FIG. 3) in order to allocate a unit to a particular unit procedure when Dynamic Unit Allocation is enabled for the unit procedure. As noted above, this routine may be programmed using, for example, an object-oriented programming language, e.g., C++, Smalltalk or JAVA, and may be stored in memory 316*b* of Batch Server Node 302*b*.

Referring to FIG. 9, Unit Procedure Step 704*b* (also shown in FIG. 7) is performed each time a Unit Procedure 702*c* (also shown in FIG. 7) is ready to begin. When Unit Procedure Step 704*b* is performed, it is realized that a unit has not yet been assigned to perform the unit procedure. Unit Procedure Step 704*b* therefore refers to its parent procedure, i.e., Batch Procedure 702*b* (also shown in FIG. 7), to obtain this information.

When Batch Procedure 702*b* is referred to by Unit Procedure Step 704*b*, it is realized that Batch Procedure 702*b* also does not possess information identifying a unit on which Unit Procedure Step 704*b* should be executed. Batch Procedure 702*b* therefore refers to its parent step, i.e., Batch Step 704*a* (also shown in FIG. 7), to obtain this information.

In response to being referred to by Batch Procedure 702*b*, Batch Step 704*a*, which includes the object BindSelection, performs a constituent method 902 of the BindSelection object ("BindSelection::SelectUnit"). Pursuant to method 902, it is determined whether the unit procedure is enabled for Dynamic Unit Allocation, Operator Scheduled Unit Allocation, or Operator Prompted Unit Allocation.

When it is determined (by method 902) that the unit procedure is enabled for Dynamic Unit Allocation, another constituent method 904 of the BindSelection object ("BindSelection::Select Unit From Class") is performed. Pursuant to method 904, another constituent method 906 of the BindSelection object ("BindSelection::GetListOfValidUnits") is called, and pursuant to method 906, yet another constituent method 908 of the BindSelection object ) "BindSelection::Validate Graph") is called.

Method 906 accesses area model graph 600 to generate a list of all units (represented by nodes in area model graph 600) on which unit procedure step 704*b* can be executed. In performing method 906, method 908 checks whether recipe graph 800 can be validated by each unit that is to be included in the generated list.

For recipe graph 800 to be validated for a particular unit, the node in area model graph 600 that represents the unit must be capable of being assigned validly to one node in recipe graph 800 while all remaining nodes in recipe graph 800 are simultaneously assigned validly to other nodes in area model graph 600. Method 908 therefore cycles through the various combinations of assignments of recipe graph nodes to area graph nodes to see if a valid combination can be identified for each node in the area model graph. If a valid combination is so identified, the unit corresponding the selected node is added to the list of valid units from which method 904 may choose.

In performing this validation of recipe graph 800, method 908 may also check: (1) to see that each of the nodes in area model graph 600 to which a node in recipe graph 800 is assigned corresponds to a unit that can handle the capacity necessary to execute the unit procedure assigned to it; and (2) to see that the Ready status I/O point of the unit, which is specified in the unit's area model graph, indicates that the unit is ready for operation. If no valid unit capable of handling the required capacity is available and ready for operation, the operator (at Client Node 302c) should be notified of this fact so that appropriate corrective action can be taken.

Once a list of valid units has been generated pursuant to method 906, method 904 is performed to select one of the units on the list to be allocated to the unit procedure step 704b. In performing this selection, method 904 may check the current priority status of the unit by examining the Priority status I/O point of the unit, which may be specified in the unit's area model graph. Using this status information, method 904 may then select the highest priority unit for allocation to unit procedure step 704b.

After method 904 has been performed and a unit has been selected, another constituent method 910 of the BindSelection object ("BindSelection::SelectUnitCB") is called back and, pursuant to method 910, method 908 is called to make sure the selected unit is valid. Method 908 checks to see that the selected unit is valid in the same manner that it checked (pursuant to method 906) to see whether each of the units in the area model graph was valid. If, pursuant to method 908, it is determined that the selected unit is not valid, then the operator (at Client Node 302c) should be notified so that corrective action may be taken and/or a different unit should be selected from the list of valid units that was generated by method 906.

If, pursuant to method 908, it is determined that the selected unit is valid, then, pursuant to method 910, Unit Procedure step 704b is called back and unit procedure step 704c may then be performed using the selected unit.

Routine 900 is iterated each time a unit procedure step 704b (for which Dynamic Unit Allocation is enabled) is performed by batch procedure 702b of batch object hierarchy 700 (FIG. 7) so that a unit in area model 400 (FIG. 4) may be dynamically assigned to the unit procedure just prior to the performance of the unit procedure.

Figure 10:
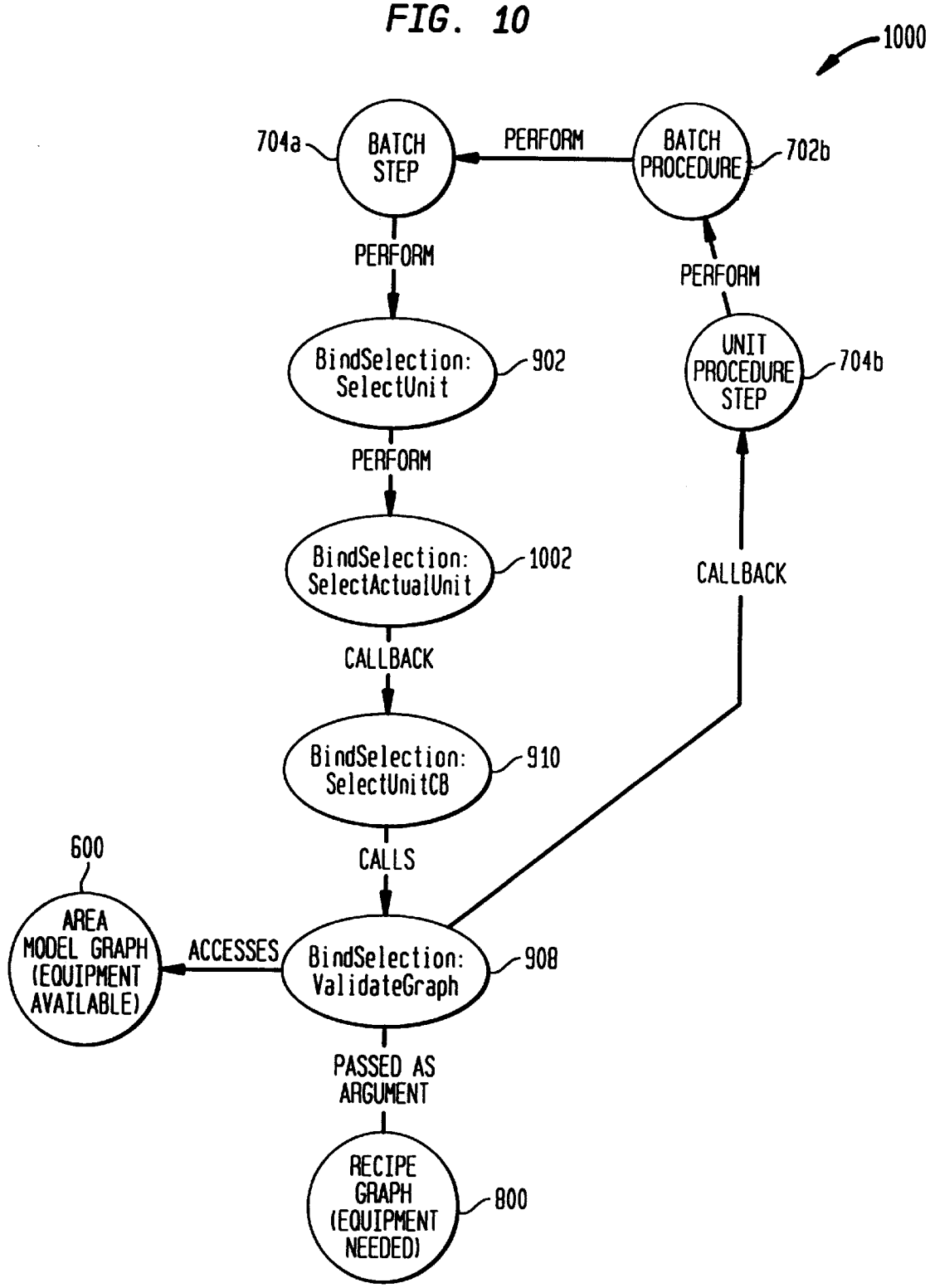

FIG. 10 illustrates a routine 1000 pursuant to which constituent methods of the BindSelection object, as well as methods of other objects, may be executed by processor 314b of Batch Server Node 302b (FIG. 3) in order to allocate a unit to a particular unit procedure when Operator Scheduled Unit Allocation is enabled for the unit procedure.

Referring to FIG. 10, Unit Procedure Step 704b (also shown in FIG. 7) is performed each time a Unit Procedure 702c (also shown in FIG. 7) is ready to begin. When Unit Procedure Step 704b is performed, it is realized that a unit has not yet been assigned to perform the unit procedure. Unit Procedure Step 704b therefore refers to its parent procedure, i.e., Batch Procedure 702b (also shown in FIG. 7), to obtain this information.

When Batch Procedure 702b is referred to by Unit Procedure Step 704b, it is realized that Batch Procedure 702b also does not possess information identifying a unit on which Unit Procedure Step 704b should be executed. Batch Procedure 702b therefore refers to its parent step, i.e., Batch Step 704a (also shown in FIG. 7), to obtain this information.

In response to being referred to by Batch Procedure 702b, Batch Step 704a, which includes the object BindSelection, performs a constituent method 902 of the BindSelection object ("BindSelection::SelectUnit"). Pursuant to method 902, it is determined whether the unit procedure is enabled for Dynamic Unit Allocation, Operator Scheduled Unit Allocation, or Operator Prompted Unit Allocation.

When it is determined (by method 902) that the unit procedure is enabled for Operator Scheduled Unit Allocation, another constituent method 1002 of the BindSelection object ("BindSelection::SelectActualUnit") is performed. Pursuant to method 1002, a unit is identified that the operator (at Client Node 302c) pre-scheduled to be used to execute unit procedure step 704b when scheduling the batch, and that unit is selected.

After method 1002 has been performed and the pre-scheduled unit has been selected, method 910 (BindSelection::SelectUnitCB) is called back and, pursuant to method 910, method 908 (BindSelection::Validate Graph) is called to make sure the selected unit is valid. Method 908 operates, as described above in connection with the description of routine 900 (FIG. 9), to see whether the node in area model graph 600 that represents the selected unit is capable of being assigned validly to one node in recipe graph 800 while all remaining nodes in recipe graph 800 are simultaneously assigned validly to other nodes in area model graph 600. Method 908 may also check: (1) to see that pre-scheduled unit can handle the necessary capacity to execute unit procedure step 704b; and (2) to see that the Ready status I/O point of the unit, which is specified in the unit's area model graph, indicates that the pre-scheduled unit is ready for operation.

If, pursuant to method 908, it is determined that the selected unit is valid, Unit Procedure step 704b is called back and may be performed using the selected unit. If, pursuant to method 908, it is determined that the pre-scheduled unit is not valid, then the operator (at Client Node 302c) should be notified so that appropriate corrective action can be taken.

Routine 1000 is iterated each time a unit procedure step 704b (for which Operator Scheduled Unit Allocation is enabled) is performed by batch procedure 702b of batch object hierarchy 700 (FIG. 7) so that each of the units that was pre-scheduled by the operator (i.e., when the batch was scheduled) is assigned to a unit procedure just prior to the performance of the unit procedure.

If the process design engineer (at Development Node 302a) granted the operator (at Client Node 302c) the right to modify the pre-scheduled allocation of units, then the operator may re-allocate units to unit procedures at any time prior to the times at which the unit procedures are performed.

Figure 11:
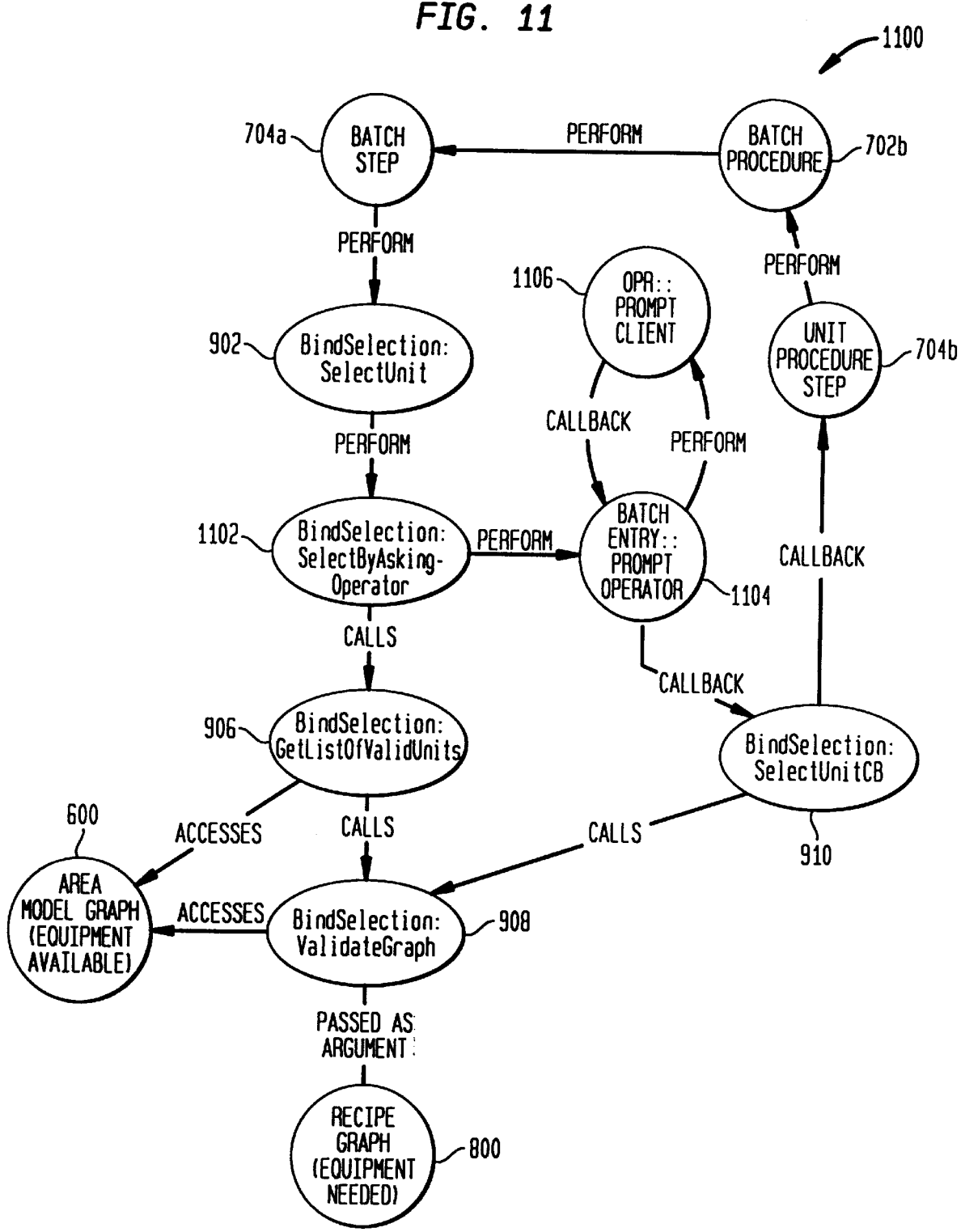

FIG. 11 illustrates a routine 1100 pursuant to which constituent methods of the BindSelection object, as well as methods of other objects, may be executed by processor 314b of Batch Server Node 302b (FIG. 3) in order to allocate a unit to a particular unit procedure when Operator Prompted Unit Allocation is enabled for the unit procedure.

Referring to FIG. 11, Unit Procedure Step 704b (also shown in FIG. 7) is performed each time a Unit Procedure 702c (also shown in FIG. 7) is ready to begin. When Unit Procedure Step 704b is performed, it is realized that a unit has not yet been assigned to perform the unit procedure. Unit Procedure Step 704b therefore refers to its parent procedure, i.e., Batch Procedure 702b (also shown in FIG. 7), to obtain this information.

When Batch Procedure 702b is referred to by Unit Procedure Step 704b, it is realized that Batch Procedure 702b also does not possess information identifying a unit on which Unit Procedure Step 704b should be executed. Batch Procedure 702b therefore refers to its parent step, i.e., Batch Step 704a (also shown in FIG. 7), to obtain this information.

In response to being referred to by Batch Procedure 702b, Batch Step 704a, which includes the object BindSelection, performs a constituent method 902 of the BindSelection object ("BindSelection::SelectUnit"). Pursuant to method 902, it is determined whether the unit procedure is enabled for Dynamic Unit Allocation, Operator Scheduled Unit Allocation, or Operator Prompted Unit Allocation.

When it is determined (by method 902) that the unit procedure is enabled for Operator Prompted Unit Allocation, another constituent method 1102 of the BindSelection object ("BindSelection::SelectByAskingoperator") is performed. Pursuant to method 1102, method 906 (BindSelection::GetListOfValidUnits) is called and, pursuant to method 906, method 908 (BindSelection::Validate Graph) is called.

Method 906 accesses area model graph 600 to generate a list of all units (represented by nodes in area model graph 600) on which unit procedure step 704b can be executed. In performing method 906, method 908 checks whether recipe graph 800 can be validated by each unit that is to be included in the generated list. The manner in which method 908 performs this validation for each unit in the generated list is described above in connection with the description of routine 900 (FIG. 9).

Once a list of valid units has been generated pursuant to method 1102, the list is passed to Batch Entry object 702a (FIG. 7) and a constituent method 1104 of Batch Entry object 702a ("BatchEntry::PromptOperator") is performed. Pursuant to method 1104, a method 1106 of another object ("Opr::PromptClient") is performed to provide the list to the operator (at Client Node 302c).

Pursuant to method 1106, the operator is prompted to select one of the units from the list to be assigned to unit procedure step 704b. In response to this prompting, the operator should select one of the units on the list, and method 1104 will be called back and the selected unit will be passed to it. After the selected unit has been passed (pursuant to method 1106) to method 1104, method 910 (BindSelection::SelectUnitCB) is called back and, pursuant to method 910, method 908 (BindSelection::Validate Graph) is called to make sure the selected unit is valid. Method 908 checks to see that the selected unit is valid in the same manner that it checked to see whether each unit in the list of units generated by method 906 was valid.

If, pursuant to method 908, it is determined that the selected unit is valid, then Unit Procedure step 704b is called back and may be performed using the selected unit. If, pursuant to method 908, it is determined that the selected unit is not valid, then the operator (at Client Node 302c) should be notified so that corrective action may be taken. The operator may, for example, be prompted to select alternate unit.

Routine 1100 is iterated each time a unit procedure step 704b (for which Operator Prompted Unit Allocation is enabled) is performed by batch procedure 702b of batch object hierarchy 700 (FIG. 7) so that the operator (at Client Node 302c) may be prompted to select a unit from a list of valid units just prior to the performance of the unit procedure.

Batch Server Node 302b also may generate information, which may be made available to Client Node 302c, regarding the current status of the recipe and the equipment being used to execute the recipe.

Client Node 302c

Using the Client application stored in memory 316c (FIG. 3), e.g., a computer program implemented using an object-oriented programming language such as C++, Smalltalk or JAVA, an operator at Client Node 302c can manage batch scheduling and execution. The operator may also receive information from Batch Server Node 302b regarding the current status of any recipes being executed and the equipment being used to execute such recipes. This information may be displayed, for example, on display 318c.

Using Client Node 302c, the operator may also access area models and recipe models from Batch Server Node 302b and these models may be displayed to the operator on a display, e.g., on display 318c. The operator, using a user interface device, e.g., mouse 310c or keyboard 312c, may communicate with Batch Server Node 302b to select or change the allocation of equipment to particular unit procedures, if the ability to do was enabled, for example, by the process design engineer (using the Recipe Editor application) at Development Node 302a.

While particular embodiments of models, charts, graphs, and various procedures have been described herein, other embodiments may alternatively be used without departing from the intended scope of the present invention.

It should also be understood that the invention is not limited to a particular computer system platform, processor, operating system, or network. Further, it should be apparent to those skilled in the art that the present invention is not limited to a specific programming language or computer system and that other appropriate programming languages and other appropriate computer systems could alternatively be used.

Additionally, while an embodiment of the invention has been described herein as storing data in particular formats, data may be stored in alternative formats without departing from the intended scope of the invention.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A recipe, which may be stored by a computer readable medium, for use with a process control system, comprising:
   unit procedures, each unit procedure to be executed on, but not yet allocated to, a unit; and
   information identifying at least one of:
   (a) at least two of the unit procedures that, when subsequently allocated to units, must be executed on units that are physically connected to one another;
   (b) at least two of the unit procedures that, when subsequently allocated to at least one unit, must be executed on the same unit; and
   (c) at least two of the unit procedures that, when subsequently allocated to units, must be executed on different units.

2. The recipe as claimed in claim 1, wherein the information identifies at least two of the unit procedures that, when subsequently allocated to units, must be executed on units that are physically connected to one another.

3. The recipe as claimed in claim 1, wherein the information identifies at least two of the unit procedures that, when subsequently allocated to at least one unit, must be executed on the same unit.

4. The recipe as claimed in claim 1, wherein the information identifies at least two of the unit procedures that, when subsequently allocated to units, must be executed on different units.

5. The recipe as claimed in claim 1, wherein the recipe further comprises information that identifies a capacity of a unit that is required in order to execute at least one of the unit procedures.

6. The recipe as claimed in claim 1, wherein the recipe further comprises information that identifies whether any of the unit procedures are to be dynamically allocated to units.

7. The recipe as claimed in claim 1, wherein the recipe is stored by a computer readable medium.

8. A method for creating or modifying a recipe that may be used with a process control system, the recipe including unit procedures to be executed on, but not yet allocated to, units, the method comprising the step of:
   prior to allocating any of the unit procedures of the recipe to particular units, storing information in memory that identifies at least one of:
      (a) at least two of the unit procedures of the recipe that, when subsequently allocated to units, must be executed on units that are physically connected to one another,
      (b) at least two of the unit procedures of the recipe that, when subsequently allocated to at least one unit, must be executed on the same unit, and
      (c) at least two of the unit procedures of the recipe that, when subsequently allocated to units, must be executed on different units.

9. The method as claimed in claim 8, further including the step of:
   based on the information stored in memory, allocating at least one of the unit procedures of the recipe to at least one unit.

10. The method of claim 9, wherein the step allocating the at least one of the unit procedures to the at least one unit includes allocating the at least one of the unit procedures to the at least one unit after a batch of the recipe has been scheduled.

11. The method as claimed in claim 8, further comprising the step of:
   storing the unit procedures of the recipe in memory, each of the unit procedures to be executed on a unit.

12. The method as claimed in claim 8, wherein the step of storing information in memory includes storing information in memory that identifies at least two of the unit procedures of the recipe that, when subsequently allocated to units, must be executed on units that are physically connected to one another.

13. The method as claimed in claim 12, further comprising the step of:
   displaying a recipe model that illustrates: (a) unit procedures that must be executed in order to execute the recipe, and (b) physical connections that must exist between units on which the unit procedures are to be executed.

14. The method as claimed in claim 13, further comprising the step of: manipulating the displayed information to adjust a configuration of the recipe.

15. The method as claimed in claim 8, wherein the step of storing information in memory includes storing information in memory that identifies at least two of the unit procedures of the recipe that, when subsequently allocated to at least one unit, must be executed on the same unit.

16. The method as claimed in claim 8, wherein the step of storing information in memory includes storing information in memory that identifies at least two of the unit procedures of the recipe that, when subsequently allocated to units, must be executed on different units.

17. The method as claimed in claim 8, further comprising the step of:
   displaying the information.

18. The method as claimed in claim 17, further comprising the step of:
   manipulating the displayed information to adjust a configuration of the recipe.

19. The method as claimed in claim 8, further comprising the step of:
   storing information in memory that identifies a capacity of a unit that is required in order to execute at least one of the unit procedures of the recipe.

20. The method as claimed in claim 8, further comprising the step of:
   storing information in memory that identifies whether any of the unit procedures of the recipe are to be dynamically allocated to units.

21. A computer readable medium for use with a process control system that controls execution of a recipe, the recipe including unit procedures to be executed on, but not yet allocated to, units, the medium having a plurality of instructions stored thereby which, when executed by a processor, cause the processor to perform the step of:
   in response to input by a user, storing information in memory that identifies at least one of:
      (a) at least two of the unit procedures of the recipe that are not yet allocated to units, and that, when subsequently allocated to units, must be executed on units that are physically connected to one another,
      (b) at least two of the unit procedures of the recipe that are not yet allocated to units, and that, when subsequently allocated to at least one unit, must be executed on the same unit, and
      (c) at least two of the unit procedures of the recipe that are not yet allocated to units, and that, when subsequently allocated to units, must be executed on different units.

22. The computer readable medium as claimed in claim 21, wherein additional instructions are stored on the medium which, when executed by the processor, cause the processor to perform the step of:
   based on the information stored in memory, allocating at least one of the unit procedures of the recipe to at least one unit.

23. The computer readable medium of claim 22, wherein the step allocating the at least one of the unit procedures of the recipe to the at least one unit includes allocating the at least one of the unit procedures of the recipe to the at least one unit after a batch of the recipe has been scheduled.

24. The computer readable medium as claimed in claim 21, wherein additional instructions are stored on the medium which, when executed by the processor, cause the processor to perform the step of:
   in response to input by the user, storing the unit procedures of the recipe in memory, each of the unit procedures to be executed on, but not yet allocated to, a unit.

25. The computer readable medium as claimed in claim 21, wherein the step of storing information includes storing information in memory that identifies at least two of the unit procedures of the recipe that are not yet allocated to units, and that, when subsequently allocated to units, must be executed on units that are physically connected to one another.

26. The computer readable medium as claimed in claim 25, wherein additional instructions are stored on the medium which, when executed by the processor, cause the processor to perform the step of:

displaying a recipe model that illustrates: (a) unit procedures that must be executed in order to execute the recipe, and (b) physical connections that must exist between units on which the unit procedures are to be executed.

27. The computer readable medium as claimed in claim 26, wherein additional instructions are stored on the medium which, when executed by the processor, cause the processor to perform the step of:

in response to the user manipulating the displayed information, adjusting a configuration of the recipe.

28. The computer readable medium as claimed in claim 21, wherein the step of storing information includes storing information in memory that identifies at least two of the unit procedures of the recipe that are not yet allocated to units, and that, when subsequently allocated to at least one unit, must be executed on the same unit.

29. The computer readable medium as claimed in claim 21, wherein the step of storing information includes storing information in memory that identifies at least two of the unit procedures of the recipe that are not yet allocated to units. and that, when subsequently allocated to units, must be executed on different units.

30. The computer readable medium as claimed in claim 21, wherein additional instructions are stored on the medium which, when executed by the processor, cause the processor to perform the step of:

displaying the information.

31. The computer readable medium as claimed in claim 30, wherein additional instructions are stored on the medium which, when executed by the processor, cause the processor to perform the step of:

in response to the user manipulating the displayed information. adjusting a configuration of the recipe.

32. The computer readable medium as claimed in claim 21, wherein additional instructions are stored on the medium which, when executed by the processor., cause the processor to perform the step of:

in response to input by the user, storing information that identifies a capacity of a unit that is required in order to execute at least one of the unit procedures of the recipe.

33. The computer readable medium as claimed in claim 21, wherein additional instructions are stored on the medium which, when executed by the processor, cause the processor to perform the step of:

in response to input by the user, storing information that identifies whether any of the unit procedures of the recipe are to be dynamically allocated to units.

34. An apparatus for configuring a recipe for use with a process control system, the recipe including unit procedures to be executed on, but not yet allocated to, units, comprising:

a memory; and means, responsive to user input, for storing information in the memory prior to allocating any of the unit procedures of the recipe to particular units, the information identifying at least one of:

(a) at least two of the unit procedures of the recipe that, when subsequently allocated to units, must be executed on units that are physically connected to one another, (b) at least two of the unit procedures of the recipe that, when subsequently allocated to at least one unit, must be executed on the same unit, and (c) at least two of the unit procedures of the recipe that, when subsequently allocated to units, must be executed on different units.

35. The apparatus as claimed in claim 34, further comprising:

means for, based on the information stored in memory, allocating at least one of the unit procedures of the recipe to at least one unit.

36. The apparatus as claimed in claim 34, further comprising:

means, responsive to user input, for storing the unit procedures of the recipe in memory, each of the unit procedures to be executed on a unit.

37. The apparatus as claimed in claim 34, wherein the means for storing information in the memory includes means for storing information in the memory that identifies at least two of the unit procedures of the recipe that, when subsequently allocated to units, must be executed on units that are physically connected to one another.

38. The apparatus as claimed in claim 37, further comprising:

means for displaying a recipe model that illustrates: (a) unit procedures that must be executed in order to execute the recipe, and (b) physical connections that must exist between units on which the unit procedures are to be executed.

39. The apparatus as claimed in claim 38, further comprising:

means, responsive to user input, for manipulating the displayed information to adjust a configuration of the recipe.

40. The apparatus as claimed in claim 34, wherein the means for storing information in the memory includes means for storing information in the memory that identifies at least two of the unit procedures of the recipe that, when subsequently allocated to at least one unit, must be executed on the same unit.

41. The apparatus as claimed in claim 34, wherein the means for storing information in the memory includes means for storing information in the memory that identifies at least two of the unit procedures of the recipe that, when subsequently allocated to units, must be executed on different units.

42. The apparatus as claimed in claim 34, further comprising:

means for displaying the information.

43. The apparatus as claimed in claim 42, further comprising:

means, responsive to user input, for manipulating the displayed information to adjust the configuration of the recipe.

44. The apparatus as claimed in claim 34, further comprising:

means, responsive to user input, for storing information in the memory that identifies a capacity of a unit that is required in order to execute at least one of the unit procedures of the recipe.

45. The apparatus as claimed in claim 34, further comprising:

means, responsive to user input, for storing information in the memory that identifies whether any of the unit procedures of the recipe are to be dynamically allocated to units.

46. A method for configuring a process control system that is to control the execution of a plurality of unit procedures on a plurality of units, at least some of the plurality of unit procedures not yet being allocated to units, the method comprising the steps of:

storing first information in memory that identifies at least one of:

(a) at least two of the plurality of unit procedures that are not yet allocated to units, and that, when subsequently allocated to units, must be executed on units that are physically connected to one another, (b) at least two of the plurality of unit procedures that are not yet allocated to units, and that, when subsequently allocated to at least one unit, must be executed on the same unit, and (c) at least two of the plurality of unit procedures that are not yet allocated to units, and that, when subsequently allocated to units, must be executed on different units; and storing second information in memory that identifies units that are physically connected to one another.

47. The method as claimed in claim 46, farther comprising the step of:

storing the plurality of unit procedures in memory, each of the plurality of unit procedures to be executed on a unit.

48. The method as claimed in claim 47, further comprising the step of:

displaying a recipe model that illustrates: (a) unit procedures that must be executed in order to process a recipe, and (b) physical connections that must exist between units on which unit procedures of the recipe are to be executed.

49. The method as claimed in claim 48, further comprising the step of:

displaying an area model that illustrates: (a) units that are available to be used to execute the recipe and that do not yet have unit procedures allocated to them, and (b) physical connections that exist between the available units.

50. A method for configuring a process control system that is to control the execution of a plurality of unit procedures on a plurality of units, comprising the steps of:

storing unit procedures in memory, each of the unit procedures to be executed on a unit;

storing first information in memory that identifies at least one of:

(a) unit procedures that must be executed on units that are physically connected to one another, (b) unit procedures that must be executed on the same unit, and (c) unit procedures that must be executed on different units;

storing second information in memory that identifies units that are physically connected to one another; and displaying an area model that illustrates: (a) units that are available to be used to execute the recipe and that do not yet have unit procedures allocated to them, and (b) physical connections that exist between the available units.

51. The method as claimed in claim 50, further comprising the step of:

displaying a recipe model that illustrates: (a) unit procedures that must be executed in order to process a recipe, and (b) physical connections that must exist between units on which unit procedures in the recipe are to be executed.

52. A method for configuring a process control system that is to control the execution of a plurality of unit procedures on a plurality of units, comprising the steps of:

storing unit procedures in memory, each of the unit procedures to be executed on a unit;

storing first information in memory that identifies at least one of:

(a) unit procedures that must be executed on units that are physically connected to one another, (b) unit procedures that must be executed on the same unit, and (c) unit procedures that must be executed on different units;

storing second information in memory that identifies units that are physically connected to one another; and using the first information, the second information, and the unit procedures stored in memory to allocate at least one unit procedure of the recipe to at least one available unit.

53. The method as claimed in claim 52, wherein the step of using the first information, the second information, and the unit procedures stored in memory to allocate the at least one unit procedure of the recipe to the at least one available unit includes the step of:

using a computer implemented routine to allocate. based upon the first information, the second information, and the unit procedures stored in memory, the at least one unit procedure of the recipe to the at least one available unit.

54. The method as claimed in claim 52, wherein the step of using the first information, the second information, and the unit procedures stored in memory to allocate the at least one unit procedure of the recipe to the at least one available unit includes the step of:

using a computer implemented routine to generate a list of available units that may validly be used to execute the at least one unit procedure of the recipe.

55. A system for configuring a process control system that is to control the execution of a plurality of unit procedures on a plurality of units, at least some of the plurality of unit procedures not yet being allocated to units, the system comprising:

means, responsive to input from a user, for storing first information in memory that identifies at least one of:

(a) at least two of the plurality of unit procedures that are not yet allocated to units, and that, when subsequently allocated to units, must be executed on units that are physically connected to one another, (b) at least two of the plurality of unit procedures that are not yet allocated to units, and that, when subsequently allocated to at least one unit, must be executed on the same unit, and (c) at least two of the plurality of unit procedures that are not yet allocated to units, and that, when subsequently allocated to units, must be executed on different units; and means, responsive to input from the user, for storing second information in memory that identifies units that are physically connected to one another.

56. The system as claimed in claim 55, further comprising:
means, responsive to input from the user, for storing the plurality of unit procedures in memory, each of the plurality of unit procedures to be executed on a unit.

57. The system as claimed in claim 56, further comprising:
means for displaying a recipe model that illustrates: (a) unit procedures that must be executed in order to process a recipe, and (b) physical connections that must exist between units on which unit procedures of the recipe are to be executed.

58. The system as claimed in claim 57, further comprising:
means for displaying an area model that illustrates: (a) units that are available to be used to execute the recipe and that do not yet have unit procedures allocated to them, and (b) physical connections that exist between the available units.

59. A system for configuring a process control system that is to control the execution of a plurality of unit procedures of a recipe on a plurality of units, comprising:
means, responsive to input from a user, for storing unit procedures in memory, each unit procedure to be executed on a unit;
means, responsive to input from the user, for storing first information in memory that identifies at least one of:
(a) unit procedures that must be executed on units that are physically connected to one another,
(b) unit procedures that must be executed on the same unit, and
(c) unit procedures that must be executed on different units;
means, responsive to input from the user, for storing second information in memory that identifies units that are physically connected to one another; and
means for displaying an area model that illustrates: (a) units that are available to be used to execute the recipe and that do not yet have unit procedures allocated to them, and (b) physical connections that exist between the available units.

60. The system as claimed in claim 59, further comprising:
means for displaying a recipe model that illustrates: (a) unit procedures that must be executed in order to process a recipe, and (b) physical connections that must exist between units on which unit procedures in the recipe are to be executed.

61. A system for configuring a process control system that is to control the execution of a plurality of unit procedures of a recipe on a plurality of units, comprising:
means, responsive to input from a user, for storing unit procedures in memory, each unit procedure to be executed on a unit;
means, responsive to input from the user, for storing first information in memory that identifies at least one of:
(a) unit procedures that must be executed on units that are physically connected to one another,
(b) unit procedures that must be executed on the same unit, and
(c) unit procedures that must be executed on different units;
means, responsive to input from the user, for storing second information in memory that identifies units that are physically connected to one another; and
means for using the first information, the second information, and the unit procedures stored in memory to allocate at least one unit procedure of the recipe to at least one available unit.

62. The system as claimed in claim 61, wherein the means for using the first information, the second information, and the unit procedures stored in memory to allocate the at least one unit procedure of the recipe to the at least one available unit includes means for generating a list of available units that may validly be used to execute the at least one unit procedure of the recipe.

63. A method for using a process control system that is to control the execution of a plurality of unit procedures of a recipe on a plurality of units, at least some of the plurality of unit procedures not yet being allocated to units, the method comprising the step of:
displaying an area model that illustrates: (a) units that are available to be used to execute the unit procedures of the recipe and that do not yet have unit procedures allocated to them, and (b) physical connections that exist between the available units.

64. The method of claim 63, wherein:
the method further comprises the step of providing a computer display; and
the step of displaying the area model includes displaying the area model on the computer display.

65. A computer-readable medium for use with a process control system that controls execution of a plurality of unit procedures on a plurality of units, at least some of the plurality of unit procedures not yet being allocated to units, the medium having a plurality of instructions stored thereby which, when executed by a processor, cause the processor to perform the step of:
displaying an area model on a display that illustrates: (a) units that are available to be used to execute the unit procedures of the recipe and that do not yet have unit procedures allocated to them, and (b) physical connections that exist between the available units.

66. A system for configuring a process control system that is to control the execution of a plurality of unit procedures of a recipe on a plurality of units, at least some of the plurality of unit procedures not yet being allocated to units, the system comprising:
at least one processor; and
means, coupled to the at least one processor, for displaying an area model that illustrates: (a) units that are available to be used to execute the recipe and that do not yet have unit procedures allocated to them, and (b) physical connections that exist between the available units.

67. A method for controlling a process, comprising a step of:
(a) after a batch of a recipe to be produced by unit procedures executed on a subset of a plurality of units has been scheduled, allocating at least one of the unit procedures to at least one of the plurality of units to define at least a portion of the subset of the plurality of units that is to be used to execute the recipe.

68. The method of claim 67, wherein the step (a) includes automatically allocating the at least one of the unit procedures to the at least one of the plurality of units just prior to when the at least one unit procedure is to be executed during execution of the recipe.

69. A computer-readable medium for use with a process control system, the medium having a plurality of instructions stored thereby which, when executed by a processor, cause the processor to perform the step of:

(a) after a batch of a recipe to be produced by unit procedures executed on a subset of a plurality of units has been scheduled, allocating at least one of the unit procedures to at least one of the plurality of units to define at least a portion of the subset of the plurality of units that is to be used to execute the recipe.

70. The computer-readable medium as claimed in claim 69, wherein the step (a) includes automatically allocating the at least one of the unit procedures to the at least one of the plurality of units just prior to when the at least one unit procedure is to be executed during execution of the recipe.

71. A system for controlling a process, comprising:

at least one processor; and means, coupled to the at least one processor, for, after a batch of a recipe to be produced by unit procedures executed on a subset of a plurality of units has been scheduled, allocating at least one of the unit procedures to at least one of the plurality of units to define at least a portion of the subset of the plurality of units that is to be used to execute the recipe.

72. The system as claimed in claim 71, wherein the means for allocating includes means for automatically allocating the at least one of the unit procedures to the at least one of the plurality of units just prior to when the at least one unit procedure is to be executed during execution of the recipe.

\* \* \* \* \*